Oct. 27, 1925.

A. SCHOPPER 1,559,466

APPARATUS FOR TESTING THE STRENGTH OF PASTEBOARD, CARDBOARD, AND THE LIKE

Filed March 19, 1924

INVENTOR

Alfred Schopper.

by his Attorney:

Patented Oct. 27, 1925.

1,559,466

UNITED STATES PATENT OFFICE.

ALFRED SCHOPPER, OF LEIPZIG, GERMANY.

APPARATUS FOR TESTING THE STRENGTH OF PASTEBOARD, CARDBOARD, AND THE LIKE.

Application filed March 19, 1924. Serial No. 700,264.

*To all whom it may concern:*

Be it known that I, ALFRED SCHOPPER, residing at Leipzig, Germany, a citizen of the German Republic, have invented certain new and useful Improvements in Apparatus for Testing the Strength of Pasteboard, Cardboard, and the like, of which the following is a specification.

A usual type of apparatus for testing the bending and breaking strength of pasteboard and the like comprises two holders, which are adapted to hold the sheet of board under test and co-operate with a spring whereby the torque necessary to bend and break such sheet may be ascertained.

According to my invention the test piece is attached to two plates, which are rotatable about a common axis, so that by moving them into an angular relation with each other the test piece is bent or broken, the rotation of one of the plates, from a position of rest, being opposed by a progressively increasing force due to a weighted pendulum or equivalent device, and means being provided for measuring the angle through which each plate is moved.

The accompanying drawings show by way of example an apparatus embodying the invention.

The sheet of cardboard $a$ hereinafter to be called the test-sheet, is attached to the two plates $b$ and $c$, which in this embodiment of the apparatus may be conveniently called vanes. The vane $b$ is fixed to a rotatable disc $d$, and the vane $c$ is fixed to a rotatable disc $e$. The discs $d$ and $e$ are carried in axial alignment by axles journalled in posts $f$ and $g$, and the vanes have edges parallel with the common axis of rotation. The axle of the disc $d$ carries a worm wheel $h$ adapted to be rotated by a crank handle $i$ and worm $k$. The axle of disc $e$ carries a weighted pendulum $l$ which opposes rotation of said disc $e$ from a normal position of rest. When the discs are rotated, the angles through which they move are indicated by pointers $o$ and $p$ on scales $m$ and $n$ respectively, which are marked on the circumference of the said discs $d$ and $e$. The difference between the angles of rotation of the two discs is an index to the angle through which the test-sheet has been bent.

Figure 1:
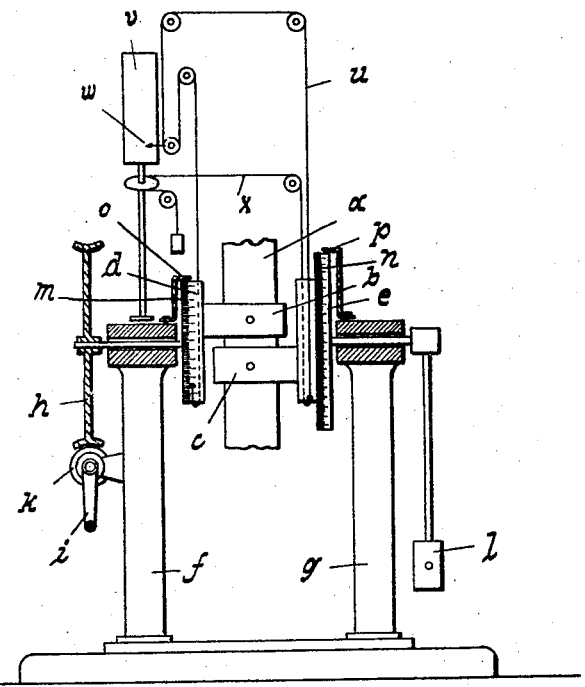
Fig. 1 is a side elevation of the complete apparatus, partly in section.
Figure 2:
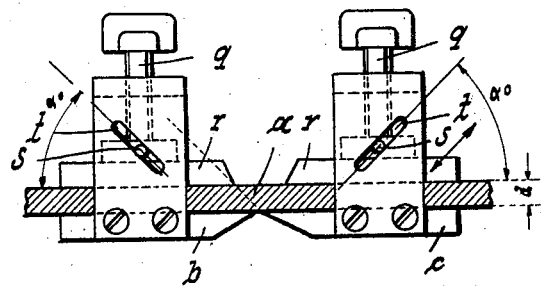
Fig. 2 shows, to a larger scale, the device for holding the test piece.

The test-sheet $a$ is attached to the two vanes $b$ and $c$ by means of the two clamps shown in Fig. 2, each of which comprises a clamping member $r$ adapted to be pressed against the test-sheet $a$ by means of a thumb screw $q$. The members $r$ are guided obliquely to the plane of the vanes by means of studs $s$ working in inclined slots $t$. This arrangement has the effect that the distance between the two clamping members $r$ is always in a predetermined relation to the thickness $d$ of the test piece, say in the proportion of 2 : 1. Consequently the results obtained with boards of different thicknesses are directly comparable.

The edges of the clamping portions of the vanes $b$ and $c$ are shown in Fig. 2 in contact or very nearly in contact with each other; if they are apart the distance between them is only just sufficient to allow of free movement of the clamping members.

In consequence of this arrangement the outer layer of the test sheet, on one side, is not subjected to any tensile strain during the bending test. In Fig. 2 the contacting edges coincide with the common axis of rotation.

A cord $u$ is secured with its ends to the discs $d$ and $e$, and passes over a series of pulleys. This cord carries a style $w$ arranged to move along a recording drum $v$, when the cord is moved by rotation of the discs. The movement of the style $w$ records the differential rotary movement of the discs $d$ and $e$. In addition, the rotation of the disc $e$, which corresponds to the bending stress of the test-sheet, is transmitted to the recording drum $v$ by means of a cord $x$ attached to the disc $e$ and engaged with a pulley $v^1$ on the spindle of the drum $v$.

It will be evident that instead of the pendulum $l$ I may use any other equivalent means.

Having now particularly described and ascertained the nature of my said invention and in what manner the same is to be performed, I declare that what I claim is:—

1. In apparatus for the purpose set forth the combination of two plates, two rotatable carriers for said plates, having their axes of rotation in alignment with each other, each plate having an edge parallel with said axis, means for attaching a test piece to both said plates, means opposing progressively increasing resistance to the rotation of one of said plate carriers from a position of rest, means for imparting rotation to the other plate carrier, and means for measuring the rotation imparted to said plate carriers respectively.

2. In apparatus for the purpose set forth the combination of two plates, two rotatable carriers for said plates, whereby said plates are rotatable about a common axis, means for attaching a test piece to both said plates, a weighted pendulum fixed to one of said plate carriers, means for imparting rotation to the other plate carrier, and means for measuring the rotation imparted to said plate carriers respectively.

3. In apparatus for the purpose set forth the combination of two plates, two rotatable carriers for said plates, whereby said plates are rotatable about a common axis, two clamping devices, one on each plate, each including a clamping member movable to and from the plate surface and an oblique guide for said clamping member, whereby the distance between the clamping member and the common axis of rotation is reduced as the member approaches the plate surface, means opposing progressively increasing resistance to the rotation of one of said plate carriers from a position of rest, means for imparting rotation to the other plate carrier, and means for measuring the rotation imparted to said plate carriers respectively.

4. In apparatus for the purpose set forth the combination of two plates, two rotatable carriers for said plates whereby said plates are rotatable about a common axis, each of said plates having an edge which coincides with said axis of rotation, means for attaching a test piece to both said plates, means opposing progressively increasing resistance to the rotation of one of said plate carriers from a position of rest, means for imparting rotation to the other plate carrier, and means for measuring the rotation imparted to said plate carriers respectively.

In witness whereof I have signed this specification.

ALFRED SCHOPPER.